(12) United States Patent
Riester et al.

(10) Patent No.: US 7,384,063 B2
(45) Date of Patent: Jun. 10, 2008

(54) MOTOR VEHICLE DOOR TRIM AND METHOD FOR THE MANUFACTURE THEREOF

(75) Inventors: Christoph Riester, Oberding/Aufkirchen (DE); Michael Dax, Altfraunhofen (DE); Friedrich Graf, Eggenfelden (DE); Lutz Lehman, Ergolding (DE); Georg Sigl, Arnstorf (DE); Marc Sieber, Landshut (DE); Thomas Sperl, Landau/Isar (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 101 days.

(21) Appl. No.: 11/368,023

(22) Filed: Mar. 3, 2006

(65) Prior Publication Data

US 2006/0208468 A1   Sep. 21, 2006

(30) Foreign Application Priority Data

Mar. 4, 2005 (DE) ...................... 10 2005 010 025

(51) Int. Cl.
*B60R 21/21* (2006.01)
(52) U.S. Cl. .................................. 280/730.2; 280/728.2
(58) Field of Classification Search ............. 280/730.2, 280/728.3, 728.2
See application file for complete search history.

(56) References Cited

U.S. PATENT DOCUMENTS

| | | | |
|---|---|---|---|
| 5,231,253 A | 7/1993 | Breed et al. | |
| 5,308,112 A * | 5/1994 | Hill et al. | ................ 280/730.2 |
| 5,443,777 A | 8/1995 | Mills | |
| 5,868,420 A | 2/1999 | Higashiura et al. | |
| 6,022,623 A | 2/2000 | Clerici et al. | |

(Continued)

FOREIGN PATENT DOCUMENTS

DE      19516230 C2     11/1996

(Continued)

OTHER PUBLICATIONS

European Search Report EP06004409, dated May 3, 2006.

(Continued)

*Primary Examiner*—Christopher Ellis
*Assistant Examiner*—Joseph Rocca
(74) *Attorney, Agent, or Firm*—Wolf, Greenfield & Sacks, P.C.

(57) ABSTRACT

A vehicle door trim for a motor vehicle with a head impact protection device for a vehicle occupant is provided. In one embodiment, the door trim includes a curb carrier of the vehicle door trim in which is located a cutout for fixing the head impact protection device in the assembled position of the vehicle door trim in an area close to the side window of the vehicle door, a head impact protection device, which comprises an airbag carrier joined to the curb carrier so as to be airtight, an airbag, which on the rim side is fixed to the airbag carrier so as to be airtight, and a gas generator, which may be permanently joined to the airbag carrier. The vehicle door trim covers a foam layer over the curb carrier and, in the area of the cutout, over the airbag carrier. A decorative layer on the side of the foam layer facing away from the curb carrier is provided. The foam layer is designed so that on actuation of the head impact protection device, it may lift easily from the airbag carrier.

21 Claims, 6 Drawing Sheets

U.S. PATENT DOCUMENTS

| | | | |
|---|---|---|---|
| 6,113,131 A | 9/2000 | Uehara et al. | |
| 6,199,897 B1 | 3/2001 | Kreile | |
| 6,276,712 B1 * | 8/2001 | Welch et al. | 280/730.2 |
| 6,325,410 B1 | 12/2001 | Eyrainer | |
| 6,402,189 B1 | 6/2002 | Gray et al. | |
| 6,753,057 B1 | 6/2004 | Gardner | |
| 7,139,650 B2 | 11/2006 | Lubischer | |
| 2002/0060447 A1 | 5/2002 | Acker et al. | |
| 2002/0164528 A1 | 11/2002 | Sunagawa et al. | |
| 2003/0011174 A1 | 1/2003 | Merrifield et al. | |
| 2004/0155441 A1 | 8/2004 | Hoffman | |
| 2004/0164531 A1 | 8/2004 | Riha et al. | |
| 2004/0199319 A1 | 10/2004 | Lubischer | |
| 2005/0040629 A1 * | 2/2005 | Chausset | 280/730.2 |
| 2005/0052005 A1 * | 3/2005 | Lunt et al. | 280/730.2 |
| 2005/0215143 A1 | 9/2005 | Wilhelm | |

FOREIGN PATENT DOCUMENTS

| | | |
|---|---|---|
| DE | 19648138 A1 | 5/1998 |
| DE | 198 19 537 A1 | 11/1998 |
| DE | 198 00 815 C1 | 2/1999 |
| DE | 19944371 A1 | 3/2001 |
| DE | 101 17 938 A1 | 4/2001 |
| DE | 101 04 036 A1 | 8/2001 |
| DE | 101 35 224 A1 | 7/2002 |
| DE | 102 29 962 A1 | 1/2004 |
| DE | 10241715 A1 | 3/2004 |
| DE | 103 15 662 A1 | 10/2004 |
| DE | 103 61 581 A1 | 7/2005 |
| DE | 102004014942 A1 | 10/2005 |
| EP | 0827867 A1 | 7/1997 |
| EP | 0916555 A | 5/1999 |
| EP | 1 445 156 A1 | 11/2003 |
| FR | 2 721 876 A1 | 1/1996 |
| FR | 2792271 A | 10/2000 |
| FR | 2799700 A1 | 4/2001 |
| JP | 05162598 A | 6/1993 |
| JP | 0827409 | 1/1996 |
| WO | WO 97/03866 A | 2/1997 |
| WO | WO 2004/087473 A | 10/2004 |

OTHER PUBLICATIONS

European Search Report EP06004408, dated May 2, 2006.
European Search Report EP06004407, dated Jun. 1, 2006.
European Search Report EP06011961, dated Oct. 10, 2006.
Office Action dated Jun. 20, 2007 from U.S. Appl. No. 11/368,331.
Office Action dated Dec. 12, 2007 from U.S. Appl. No. 11/368,331.

* cited by examiner

MOTOR VEHICLE DOOR TRIM AND METHOD FOR THE MANUFACTURE THEREOF

BACKGROUND

1. Field

Aspects of the present invention relate to a vehicle door trim for a motor vehicle with a head impact protection device and a method for the manufacture thereof.

2. Discussion of Related Art

Side impact protection devices (often referred to as side airbags) are used in motor vehicles. When actuated by sensor control, side impact protection is intended to protect the pelvic and thoracic areas of the occupant of a motor vehicle. Head impact devices are increasingly being used in motor vehicles as well. Such head impact protection devices (often referred to as headbags) serve to protect the head of a motor vehicle occupant from impacting with the side window.

Conventionally, head impact protection devices are built into the roof liner of vehicles and comprise one or more gasbags which deploy from the roof area of a vehicle on actuation of the protective device.

In motor vehicles where it is not possible to accommodate a head impact protection device in the roof area, such as in open-top convertibles, the gasbags or airbags of a head impact protection device must be built into the area of the door side trim.

The interior trim of a standard door structure comprises an armrest below which is found the area in which a storage pocket is often located. Above the armrest is what is known as the center section of the door trim. The transition area between the center section and the top side of the door trim.(the curved area between the center section and the essentially horizontally disposed transition area between the door trim and the side window) is referred to as the curb.

U.S. Pat. No. 5,231,253 discloses a head impact protection device which deploys after opening of the door trim's center section.

DE 103 15 662 A1 discloses an airbag module attached in the body-in-white area of the door wherein a part of the body-in-white door area also serves as a firing channel for the gasbag being deployed. The gasbag's opening behavior does not depend on the position of the window. For this reason, the gasbag also has a partial constriction in order to stabilize the deployment process and to do away with the need to guide the gasbag along a surface, such as the window for example. The gasbag lid integrated in the vehicle door trim has specific weakening areas along which the vehicle door trim tears open or which serve as a hinge mechanism. The gasbag lid extends over the area of both the curb and also the center section of the vehicle door trim.

EP 1 445 156 A1 describes a side impact protection device for a vehicle occupant in which a prefabricated airbag module consisting of a gasbag with outer casing, gas lance and compressed air source is attached to a side wall of the vehicle door by means of screws. On actuation of the airbag module, the vehicle door trim tears open along its entire length wherein a defined weakening of the trim is provided in the face of the trim at approximately the height of the pivotable top edge area to support this movement. In this case, the weakening may be formed by several contiguous slot-shaped apertures or may be a continuous, v-shaped or semicircular indentation on the substrate part of the trim.

DE 101 17 938 A1 describes a configuration of an airbag in the area of the instrument panel of a motor vehicle. Two second chambers are provided however no modular-type unit including gas generator capable of pre-assembly is previously described.

SUMMARY

In one illustrative embodiment, a vehicle door trim for a motor vehicle with a head impact protection device for a vehicle occupant is provided. The door trim includes a curb carrier of the vehicle door trim in which a cutout for fixing of the head impact protection device is situated in an area close to a side window of the vehicle door in the installed position of the vehicle door trim, and a head impact protection device. The head impact protection device includes an airbag carrier joined to the curb carrier and constructed and arranged to be airtight; an airbag fixed to the airbag carrier on a rim side; and a gas generator permanently attached to the airbag carrier. The door trim further includes a foam layer disposed over the curb carrier and, in the area of the cutout, over the airbag carrier; and a decorative layer disposed on the side of the foam layer facing away from the curb carrier. The foam layer is sufficiently elastic that it lifts from the airbag carrier on actuation of the head impact protection device.

In another illustrative embodiment, a method for pre-assembly of a vehicle door trim is provided. The door trim includes a curb carrier of the vehicle door trim in which a cutout for fixing of the head impact protection device is situated in an area close to a side window of the vehicle door in the installed position of the vehicle door trim, and a head impact protection device. The head impact protection device includes an airbag carrier joined to the curb carrier and constructed and arranged to be airtight; an airbag fixed to the airbag carrier on a rim side; and a gas generator permanently attached to the airbag carrier. The door trim further includes a foam layer disposed over the curb carrier and, in the area of the cutout, over the airbag carrier; and a decorative layer disposed on the side of the foam layer facing away from the curb carrier. The foam layer is sufficiently elastic that it lifts from the airbag carrier on actuation of the head impact protection device. The method includes sealing the cutouts in the curb carrier of the vehicle door trim with a removable masking cover, back-foaming a skin on the curb carrier, removing the masking cover, and inserting and fixing the head impact protection device.

In yet another illustrative embodiment, a method for pre-assembly of an interior vehicle door trim is provided. The door trim includes a curb carrier of the vehicle door trim in which a cutout for fixing of the head impact protection device is situated in an area close to a side window of the vehicle door in the installed position of the vehicle door trim, and a head impact protection device. The head impact protection device includes an airbag carrier joined to the curb carrier and constructed and arranged to be airtight; an airbag fixed to the airbag carrier on a rim side; and a gas generator permanently attached to the airbag carrier. The door trim further includes a foam layer disposed over the curb carrier and, in the area of the cutout, over the airbag carrier; and a decorative layer disposed on the side of the foam layer facing away from the curb carrier. The foam layer is sufficiently elastic that it lifts from the airbag carrier on actuation of the head impact protection device. The door trim further includes a cover between the fabric layer of the airbag and the foam layer, the cover being configured such that the foam layer does not penetrate into the fabric layer of the airbag during foaming of the foam material. The method includes installing a head impact protection device on the curb carrier of the vehicle door trim, and back-foaming a skin on the curb carrier.

In still another illustrative embodiment, a method for pre-assembly of a vehicle door trim is provided. The door trim includes a curb carrier of the vehicle door trim in which a cutout for fixing of the head impact protection device is situated in an area close to a side window of the vehicle door in the installed position of the vehicle door trim, and a head impact protection device. The head impact protection device includes an airbag carrier joined to the curb carrier and constructed and arranged to be airtight; an airbag fixed to the airbag carrier on a rim side; and a gas generator permanently attached to the airbag carrier. The door trim further includes a foam layer disposed over the curb carrier and, in the area of the cutout, over the airbag carrier; and a decorative layer disposed on the side of the foam layer facing away from the curb carrier. The foam layer is sufficiently elastic that it lifts from the airbag carrier on actuation of the head impact protection device. The method includes sealing the cutouts in the curb carrier of the vehicle door trim with a removable masking cover, generating a foam layer in a closed mold, applying the decorative layer onto the foam layer, removing the masking cover, and inserting and fixing the head impact protection device.

In yet another illustrative embodiment, a method for pre-assembly of an interior vehicle door trim is provided. The door trim includes a curb carrier of the vehicle door trim in which a cutout for fixing of the head impact protection device is situated in an area close to a side window of the vehicle door in the installed position of the vehicle door trim, and a head impact protection device. The head impact protection device includes an airbag carrier joined to the curb carrier and constructed and arranged to be airtight; an airbag fixed to the airbag carrier on a rim side; and a gas generator permanently attached to the airbag carrier. The door trim further includes a foam layer disposed over the curb carrier and, in the area of the cutout, over the airbag carrier; and a decorative layer disposed on the side of the foam layer facing away from the curb carrier. The foam layer is sufficiently elastic that it lifts from the airbag carrier on actuation of the head impact protection device. The door trim further includes a cover between the fabric layer of the airbag and the foam layer, the cover being configured such that the foam layer does not penetrate into the fabric layer of the airbag during foaming of the foam material. The method includes installing a head impact protection device on the curb carrier of the vehicle door trim, generating a foam layer in a closed mold, and applying the decorative layer onto the foam layer.

In still another illustrative embodiment, a vehicle door trim for a motor vehicle is provided. The vehicle door trim is adapted to cooperate with a head impact protection device for a vehicle occupant. The door trim includes a curb carrier having a cutout. The curb carrier is adapted to attach the head impact protection device in an area close to a side window of the vehicle door. The door trim also includes a foam layer disposed over the curb carrier and, in the area of the cutout. The foam layer is sufficiently elastic that it lifts from the airbag carrier on actuation of the head impact protection device.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which.

DETAILED DESCRIPTION

Figure 1:
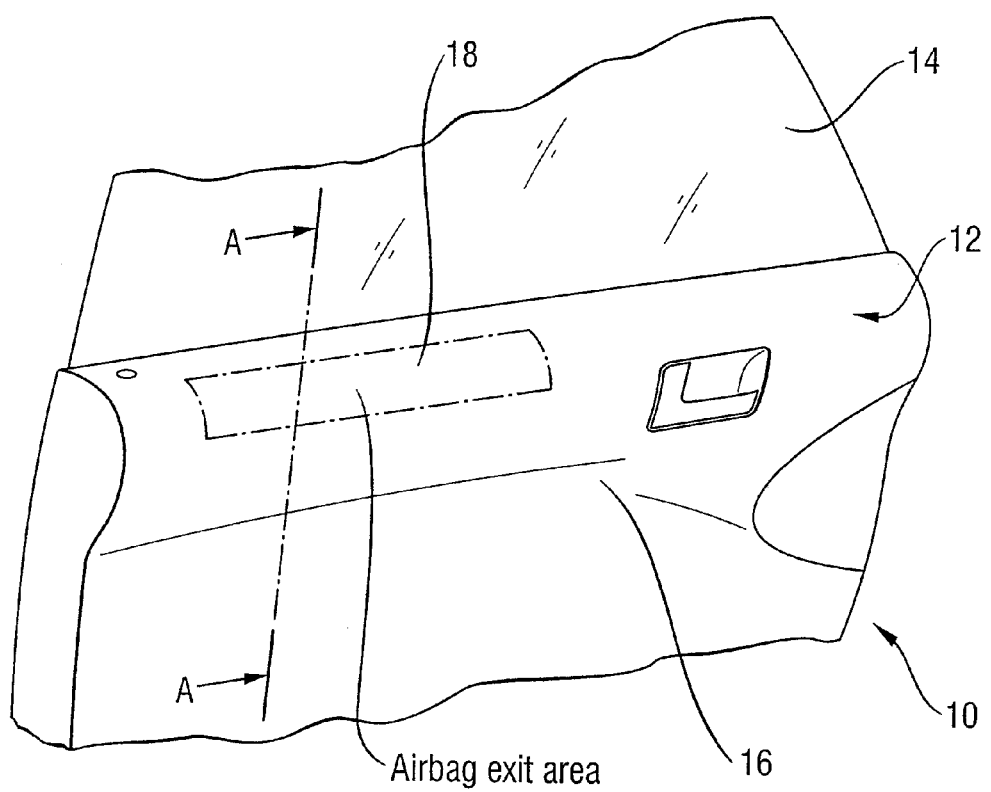
FIG. 1 is a schematic diagram of a part of a vehicle door showing the position of a head impact protection device.

Aspects of the invention relate to a vehicle door for a motor vehicle such that it is possible to integrate a head impact protection device that is not visible to a vehicle occupant. Also, assembly of the vehicle door should be particularly easy.

In one embodiment, a vehicle door trim for a motor vehicle with a head impact protection device for a vehicle occupant is provided. The door trim includes a curb carrier, a head impact protection device, a foam layer over the curb carrier and an airbag carrier of the head impact protection device. A decorative layer on top of the foam layer may be employed. In one embodiment, the foam layer is designed such that it lifts easily off the airbag carrier on actuation of the head impact protection device. The curb carrier of the vehicle door trim may have a cutout for fixing the head impact protection device in an area located close to the side window after assembly of the vehicle door trim in the vehicle door.

The head impact protection device, which in ordinary parlance corresponds to a headbag but not to a side airbag, in one embodiment, comprises an airbag carrier joined to the curb carrier so as to be airtight, an airbag which is attached to the rim side on the airbag carrier so as to be airtight and a gas generator which is permanently attached to the airbag carrier. Thus, the head impact protection device represents a production module wherein the airbag carrier, the airbag and the gas generator may be already provided as a unit. The airbag carrier is joined so as to be airtight with the curb carrier, i.e., the entire module is located in the cutout of the curb carrier wherein the airbag carrier is joined permanently to the curb carrier which surrounds the cutout.

In one embodiment, the foam layer extends over the curb carrier and, in the vicinity of the cutout, over the airbag carrier. In this manner, a continuous foam layer is provided and the position of the cutout and/or the position of the head impact protection device is not easily detectable. The same applies to the decorative layer provided over the foam layer on the side facing away from the curb carrier. The decorative layer is also designed such that a vehicle occupant cannot easily detect where the head impact protection device integrated in the vehicle door trim is located. In one embodiment, an externally detectable weakening is not necessary because the pliable foam layer lifts easily off the airbag carrier on actuation of the head impact protection device.

In one embodiment, the vehicle door trim is provided with the pre-assembled head impact protection system. Thus, the vehicle door trim can be inserted as a whole during door assembly. Additional fixing of the airbag carrier to the body-in-white of the vehicle door is merely optional. Further, additional assembly steps with appropriate shaping, e.g. on provision of a hook-shaped fixing attachment on the airbag carrier which encompasses the body-in-white of the vehicle door or a structural element linked thereto, need not be employed.

In one embodiment, the procedure for pre-assembly of a vehicle interior door trim comprises the following steps. The cutout in the curb carrier of the vehicle door trim is sealed with a removable masking cover. At this point, the head impact protection device is not yet attached to the curb carrier. A skin on the curb carrier is backed with foam. In this regard, the foam is applied between two mold carriers whereby one mold carrier carries the curb carrier sealed with the removable masking cover and the other mold carries the decorative layer. The cover is removed after back-foaming and the head impact protection device is inserted and attached in place of the masking cover.

Alternatively, instead of the back-foaming of a skin on the curb carrier, it is also possible to generate the foam layer in a closed mold and to apply the decorative layer to the foam layer in a separate step. In one embodiment, this may be performed by bonding or lamination.

In one embodiment, the head impact protection device has at least one fixing device for creating a connection to the body-in-white of the vehicle door. In one embodiment, the fixing device may be a hook-shaped section of the airbag carrier. In the assembled state, this can encompass a part of the door seal linked to the body-in-white of the vehicle door. In this alternative embodiment, the optionally desired connection between the head impact protection device and the body-in-white of the vehicle door is generated automatically during installation of the completely pre-assembled vehicle door trim. No additional work step need be performed. It should be appreciated that the present invention is not limited in this respect. In one embodiment, the airbag carrier can also be provided with a fixing lug which is screwed to the body-in-white of the vehicle door. In this embodiment, the head impact protection device may be located only in the curb area of the vehicle door trim. Thus, the curb area of the vehicle door trim can be assembled first, after which the airbag carrier can be screwed to the body-in-white of the vehicle door by way of the lug attached to the carrier. The other main components of the door's interior trim, such as the center section, armrest and map pocket, can be subsequently assembled. However, in one embodiment, one or a plurality of these components can be connected to the curb area in one piece. Thus, only the center section of the door trim need be fixed in place subsequently. In this manner, in the event of a repair, easier access to components in the door structure may be provided without having to remove the entire door trim.

In one embodiment, the airbag carrier has a first gas-tight sealed chamber pointing away from the foam layer in which chamber the gas generator is disposed. The first chamber has at least one, and in one embodiment, a plurality of openings, for gas on the side pointing towards the foam layer. In one embodiment, the first chamber on the side pointing toward the foam layer is covered with a single layer of the airbag fabric. In this manner, a layer of the airbag fabric is disposed between the airbag carrier and the foam layer.

To enable fast deployment of the airbag, in one embodiment, the airbag carrier is provided with a plurality of openings through which the quantity of gas generated in the gas generator on actuation of the head impact protection device is blown into the gasbag (also referred to as an airbag).

It should be appreciated that a single layer of the airbag fabric lying smoothly over the airbag carrier represents only a small part of the airbag's surface. Thus, in one embodiment, the airbag carrier also has a second chamber that is sealed toward the inside of the vehicle door and dimensioned to accommodate compactly folded layers of the airbag.

In one embodiment, only a single second chamber is provided, whereby in the assembled position, the first chamber is disposed closer to the side window of the vehicle door and the second chamber is disposed on the side of the first chamber facing toward the center section of the vehicle door trim. With this arrangement, on actuation of the head impact protection device, the strongest airbag deployment occurs in the immediate vicinity of the first chamber in which the gas generator is located. This allows the foam layer to lift easily off the airbag carrier on actuation of the head impact protection device.

This also allows the airbag to deploy upwards from the door trim primarily along the side window of the vehicle door.

In one embodiment, the second chamber facing toward the foam layer with a reduced slot-shaped opening for the airbag fabric whereby the opening cross-section of the slot-shaped opening is smaller than the cross-sectional dimensions of the second chamber is provided. The requirements on the compressive strength of an interior door trim, especially in the curb area, are very different to those in the area of the instrument panel. Thus, in one embodiment, the curb area must be able to withstand high compressive forces applied from outside. Therefore, in one embodiment, the opening cross-section of the second chamber is reduced as much as possible and the opening formed by the second chamber is sealed by the airbag carrier. In one embodiment, the slot-shaped openings can have cross-sectional dimensions which are less than half the cross-sectional dimensions of the second chamber. In one embodiment, the slot-shaped openings have a cross-sectional dimension that are less than a quarter of the cross-sectional dimensions of the second chamber. The slot-shaped openings should be large enough to allow unimpeded deployment of the airbag linked to an adequate speed with which the fabric can follow from the second chamber.

In one embodiment, the head impact protection device is designed such that it can be attached to the curb carrier in a single work step as a complete structural unit comprising the airbag carrier, the airbag and the gas generator. This enables a high level of integration in the area of the door trim.

In one embodiment, the airbag carrier is welded to the curb carrier. The provision of a welded joint represents an easy alternative for creating an airtight and permanent joint between airbag carrier and curb carrier. Alternative joining arrangements may be employed, as the present invention is not limited in this respect. For example, the airbag carrier and curb carrier can be bonded together.

According to one embodiment, the vehicle door trim also has a cover between the airbag layer and the foam layer which is designed such that the foam material does not penetrate into the airbag layer during foaming. This embodiment may be desirable if the alternative method for pre-assembly of a vehicle door trim is to be carried out during which the head impact protection device is fixed to the curb carrier of the vehicle door trim prior to back-foaming of a skin on the curb carrier. Thus, closing the cutout in the curb carrier with a masking cover may be dispensed with and the assembly can be further simplified. The cover between the airbag layer and the foam layer represents a separating layer between the fabric of the airbag and the foam layer and may prevent an undesirable connection between the two. In this case the cover can be a plastic film or a fabric coated with plastic on one side, as the present invention is not limited in this respect. Alternatively, a plastic flap may be provided. Regardless of how the cover between the airbag layer and the foam layer is formed, in one embodiment, the cover is part of the head impact protection device which is capable of pre-assembly, i.e. the module pre-assembled in an upstream production step which can be attached as a whole to the curb carrier of the door trim.

In one embodiment, the decorative layer comprises a plastic film. In this case, the plastic film can be selected based on the desired visual and tactile properties.

According to one embodiment, the decorative layer comprises leather, imitation leather or textile material, which may be bonded to or stretched over the foam layer. In this embodiment, the foam is formed in a sealed mold and the decorative layer is applied onto the foam layer in a separate production step.

Turning now to the Figures, identical structural elements or structural elements corresponding to each other are referred to by the same reference numbers in each case.

FIG. 1 shows the general construction of the inside of a vehicle door. In this regard, the vehicle door generally referred to by the reference number 10 is only represented in part and in particular in the vicinity of curb 12 which represents the area of the door trim situated closest to side window 14. As used herein, the area of the curb is that area in which is located the transition between the center section 16 disposed above an armrest (not shown) and the closure area of the vehicle door trim and which runs essentially horizontally in the direction of side window 14.

Attachment area 18 of the head impact protection device is shown in the schematic diagram of FIG. 1. However, as mentioned, in one embodiment, the head impact protection device is not detectable by the vehicle occupant. Rather, FIG. 1 shows that the exit area of the airbag does not extend over the entire length of the vehicle door and also that, in one embodiment, it is disposed exclusively in the area of curb 12. Center section 16 may include a side impact protection device.

In each of FIGS. 2 to 6, a vertical section is shown through the door structure taken along the line 2-2 of FIG. 1. All the features in the following description may be applicable to any entry door of a motor vehicle, (i.e., the driver's door, the passenger door or the rear doors).

Figure 2:
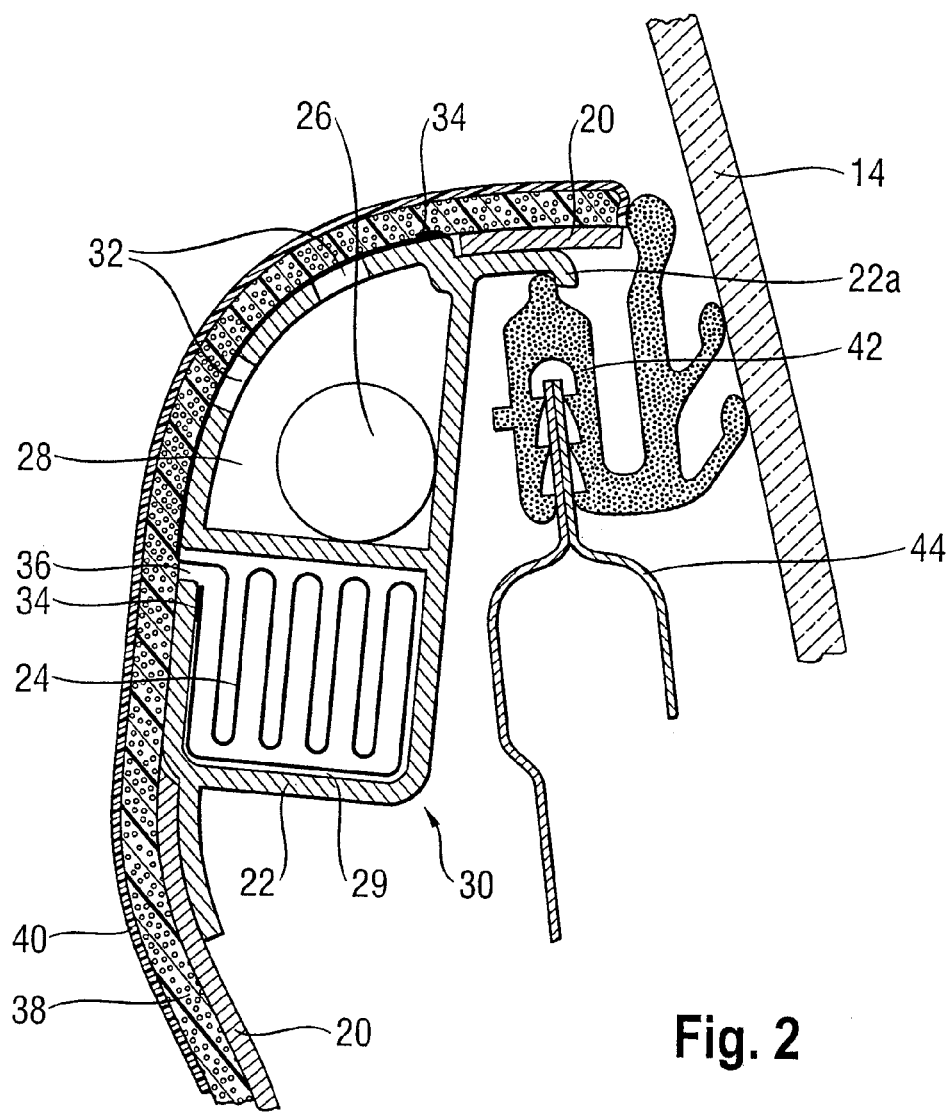
FIG. 2 is a horizontal sectional schematic view taken along line 2-2 of FIG. 1.

FIG. 2 shows curb carrier 20 having a cutout for fixing of head impact protection device 30. Head impact protection device 30 includes an airbag carrier 22, an airbag 24 and a gas generator 26, each of which is integrated into head impact protection device 30.

In one embodiment, both curb carrier 20 and airbag carrier 22 are preferably injection molded parts that may be made, for example, of ABS and/or PC. In the overlap area shown between curb carrier 20 and airbag carrier 22, in one embodiment, they are joined together so as to be airtight. In one embodiment, they may be welded or bonded together.

In one embodiment, airbag carrier 22 has a first chamber 28 and a second chamber 29, which are disposed contiguously next to each other and are separated from each other by a wall of the airbag carrier 22. Both the first chamber 28 and the second chamber 29 are sealed so as to be gastight towards the outside of the door. Gas generator 26 is located in first chamber 28. Any gas generator that provides the necessary volume of gas for airbag deployment can be used, as the present invention is not limited in this respect. In one embodiment, the gas generator is provided within first chamber 28 and first chamber 28 is provided with a plurality of outlet openings 32 towards the airbag fabric through which the gas generated in gas generator 26 can be introduced into the airbag fabric. The airbag fabric is permanently attached at position 34 and is connected to airbag carrier 22 so as to be gastight. Instead of the fixing point situated on the inside of the chamber which is difficult to access, it is also possible for a fixing point to be located on the outside of the chamber in the vicinity of second chamber 29.

Starting at fixing point 34 of the airbag situated closer to side window 14, in one embodiment, a layer of the airbag extends over the wall of first chamber 28 (which is provided with outlet openings 32) to a slot-shaped opening 36 into second chamber 29. In one embodiment, airbag 24 is tightly folded and accommodated as compactly as possible in the area of second chamber 29. A foam layer 38 is disposed on curb carrier 20, airbag carrier 22 and on a portion of the fabric of airbag 24. The foam may be made, for example, of PU foam. A decorative layer 40 is applied to foam layer 38 and forms the closure of the door trim facing towards the interior of the vehicle.

As is further apparent from FIG. 2, the airbag carrier is provided with a fixing tongue 22a which encompasses a door seal 42. Seal 42 is pushed onto the body-in-white of the vehicle door, which is may be made of metal, although the inventive aspects are applicable to vehicle doors made of other materials. In one embodiment, airbag carrier 22 is fixed to body-in-white 44 without requiring a separate process step for fixing. The appropriate attachment is effected automatically upon attaching the vehicle door trim.

Figure 3:
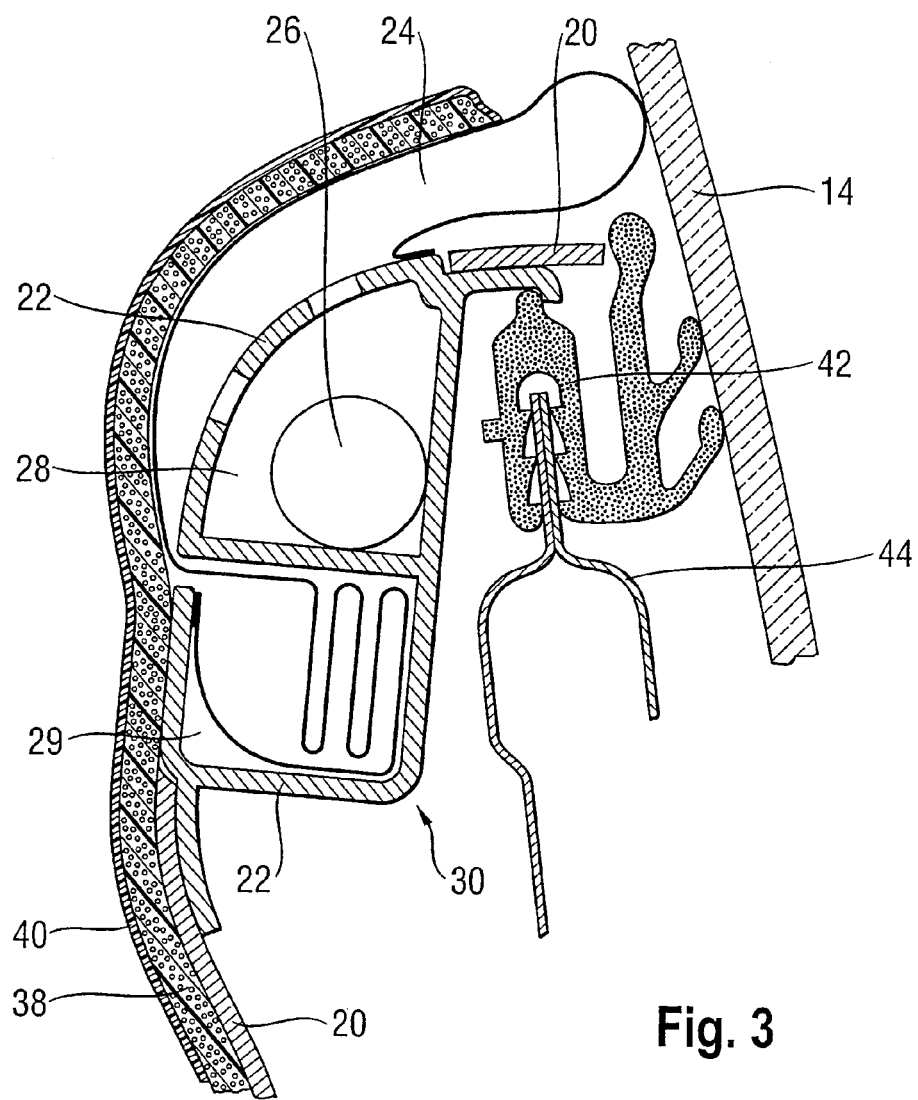
FIG. 3 is a view of FIG. 2 during actuation of the head impact protection device.

FIG. 3 shows actuation of the head impact protection device. A sensor (not illustrated) may be employed to actuate the airbag. As is known, the gas released by gas generator 26 deploys airbag 24 whereby foam layer 38 and decorative layer 40 (which is joined to the foam layer) lift from both airbag carrier 22 and curb carrier 20. No separate weakening of the material in foam layer 38 or decorative layer 40 is required because, due to the elasticity of the foam layer, the foam layer deforms as a result of the pressure exerted by the airbag as it deploys. The airbag can thus be deployed in the immediate vicinity of side window 14 and in an upward direction. In this embodiment, airbag carrier 22 and curb carrier 20 remain in their positions—only the unit including foam layer and decorative layer is deformed under the pressure of airbag 24 filling up to the extent that this airbag is able to exit upwards, thereby functioning as a head impact protection device.

Figure 4:
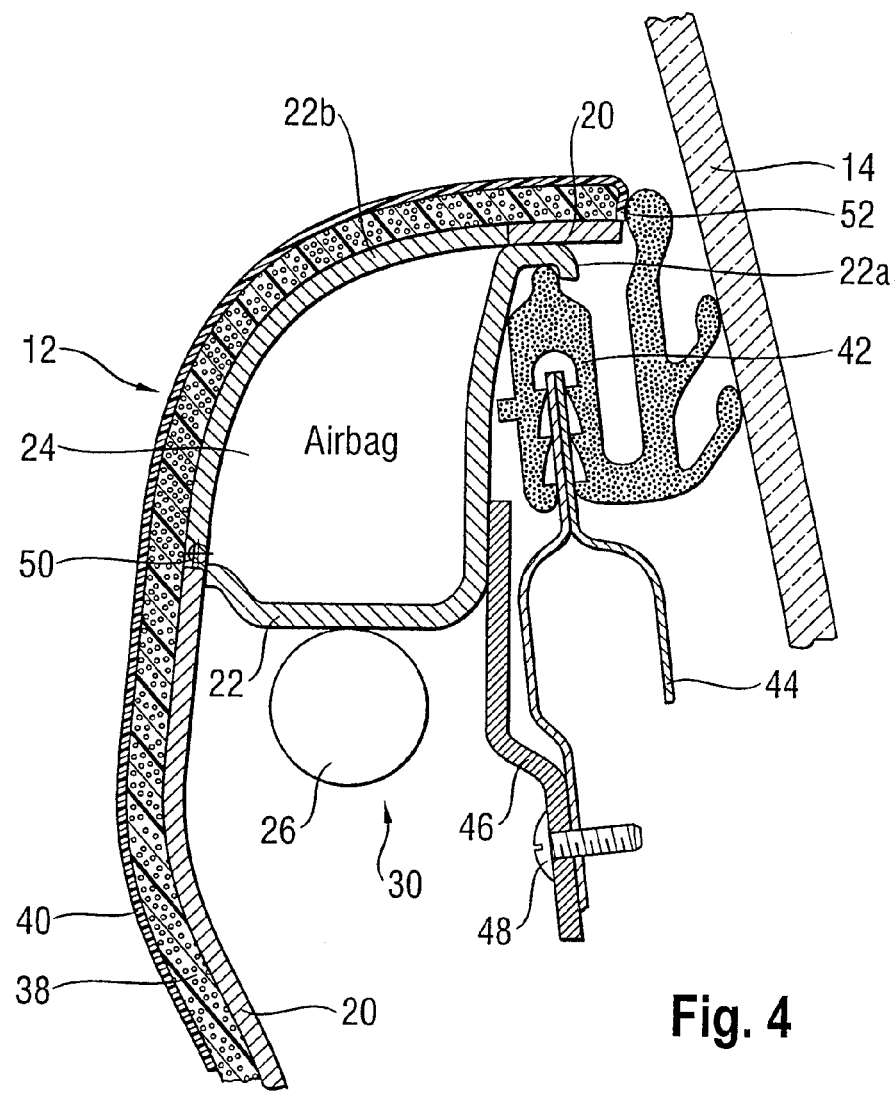
FIG. 4 is an alternative embodiment of a part of the vehicle door shown in FIG. 2.
Figure 5:
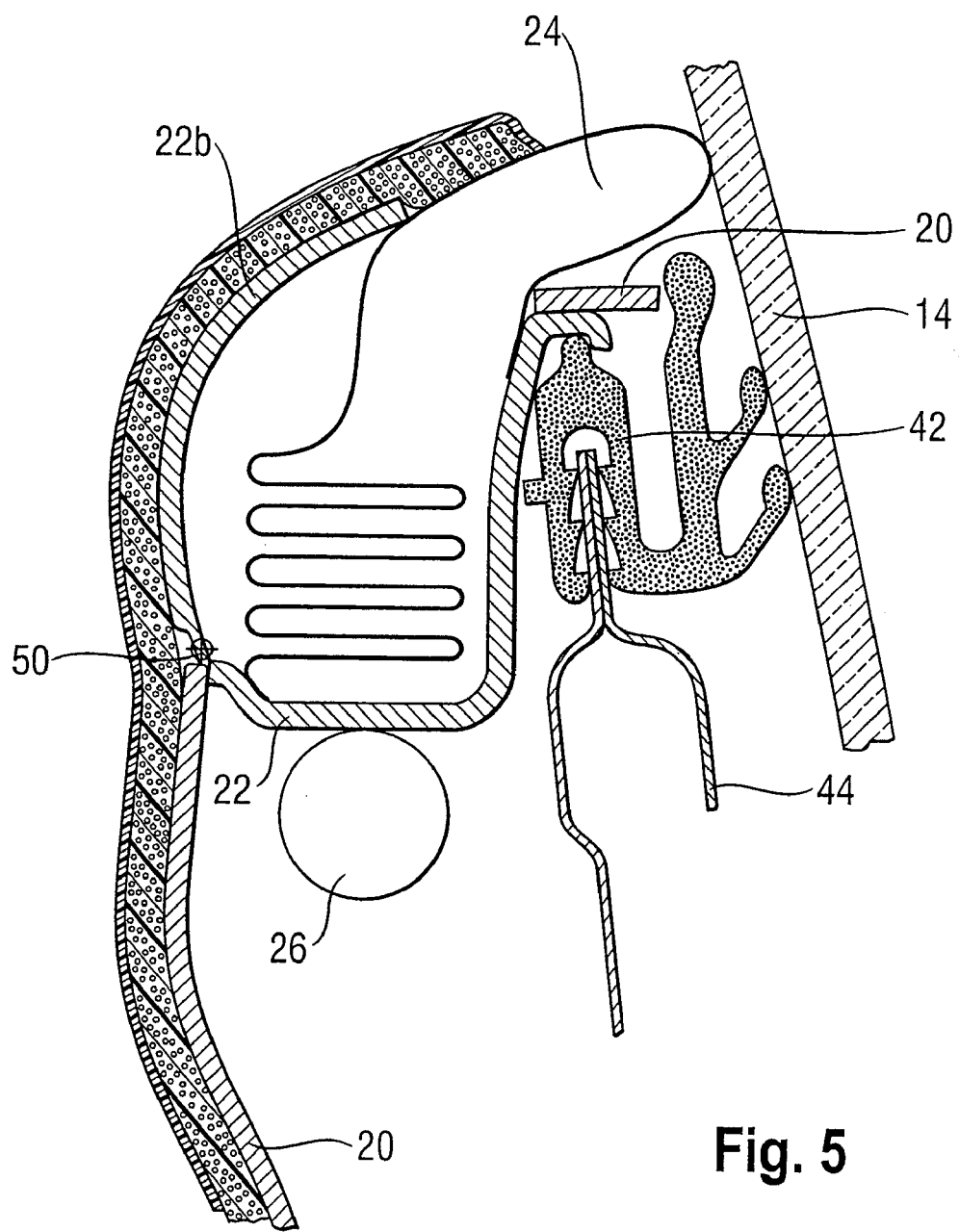
FIG. 5 is a view of FIG. 4 during actuation of the head impact protection device.

The embodiment illustrated in FIGS. 4 and 5 differs from those in FIGS. 2 and 3 in that the head impact protection device 30 has a different design and, as a result, deploys differently. The shape of curb carrier 20 shown in the embodiment according to FIGS. 4 and 5 is identical to that shown in the embodiment according to FIGS. 2 and 3. The curb carrier 20 is provided with a cutout. Foam layer 38 and decorative layer 40 lie over curb carrier 20. Fixing tongue 22a is formed as part of the airbag carrier 22 and encompasses door seal 42. Door seal 42 is pushed onto body-in-white 44 of the vehicle door. The head impact protection device 30 can be assembled as a complete structural unit including airbag carrier 22, airbag 24 and gas generator 26.

In one embodiment, the airbag carrier 22 forms only a single chamber in which airbag 24 is housed in the folded condition. Gas generator 26 is disposed outside this chamber, although it may be permanently attached to airbag carrier 22 to allow easy installation in the form of pre-assembled modules. Airbag carrier 22 can optionally be joined permanently by way of a lug 46 permanently attached (e.g. welded or bonded) onto the carrier, to body-in-white 44 by means of a joining element 48. Screws or even fixing clips may be used as joining element 48. Other suitable joining elements may be used, as the present invention is not limited in this respect. The provision of lug 46 should, however, only be seen as optional. It should be appreciated that, in one embodiment, head impact protection device 30 may be pre-assembled as part of the whole vehicle door trim and may be attached in the vehicle door in one work process on installation of the vehicle door trim.

As is apparent from FIG. 4, in one embodiment, airbag carrier 22 is provided with a wall section 22b in which there are no openings for gas to pass through. As a result of this, on actuation of head impact protection device 30, wall section 22b of airbag carrier 22 must be deformed together with elastic foam layer 38 and decorative layer 40 disposed over it. In the embodiment according to FIGS. 2 and 3 no additional measures are necessary in order to deform the easily deformable unit consisting of foam layer and decorative layer to the extent that airbag 24 can appear close to window 14 of the vehicle door. On the other hand, in the embodiment according to FIGS. 4 and 5, using a relatively rigidly designed wall section 22b, a corresponding measure must be taken so that wall section 22b deforms in a predetermined and desired manner. As is apparent from the progression of FIGS. 4 and 5, wall section 22b moves on deployment of airbag 24 around a pivot point 50 disposed essentially horizontally in the vehicle door trim. Foam panel 38 and also decorative panel 40 lying over it are sufficiently changeable in shape to perform the movement around pivot point 50 with wall section 22b without additional measures.

In one embodiment, pivot point 50 in airbag carrier 22 can be formed as weakening of the material in this area. This weakening is created, in one embodiment, during the injection molding production of head impact protection device 30.

Also in the embodiment according to FIGS. 4 and 5, head impact protection device 30 may be pre-installed as a completely pre-assembled overall unit including gas generator. Furthermore, in one embodiment, the head impact protection device is disposed exclusively in curb area 12 of the vehicle door trim and does not extend into the center section of the door trim. Also in the embodiment according to FIGS. 4 and 5, the horizontal extent of the head impact protection device is defined as indicated by dimensions 18 of FIG. 1, which also equates to the cutout formed in curb carrier 20.

Common to both embodiments, on actuation of the head impact protection device (that is, on firing of the headbag system), the foam in the area of the curb carrier is cut through. Also, decorative layer 40 in the immediate vicinity of side window 14 may be provided with a folded edge part 52 out of which the decorative layer is pulled by airbag 24 as it deploys. A further common feature of both embodiments is that head impact protection device 30 is designed so that its position is not readily detectable from inside the vehicle.

Figure 6:
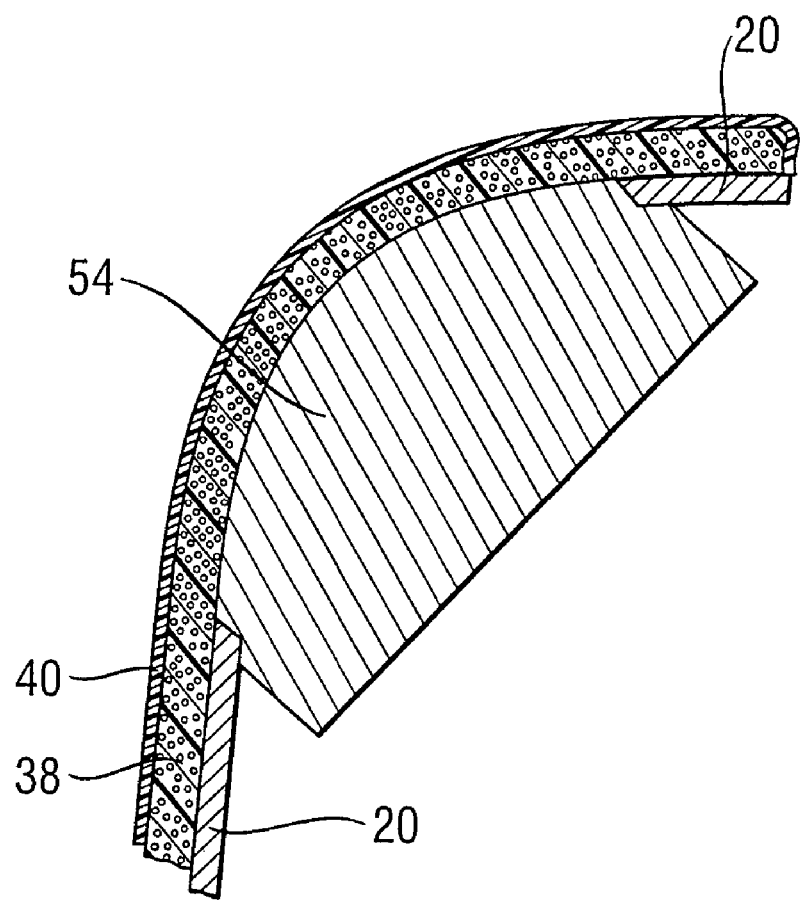
FIG. 6 is a schematic diagram of the curb carrier area of the interior door trim in the vicinity of a cutout for fixing the head impact protection device during the manufacturing process of the vehicle door trim.

FIG. 6 shows schematically an intermediate step during manufacture of the vehicle door trim according to one embodiment. Once the cutout for receiving the head impact protection device provided in curb carrier 20 has been firmly sealed in a first work step with the help of a masking cover 54, foam layer 38 and decorative layer 40 are generated on the curb carrier sealed with the masking cover. As explained, this can be done both by back-foaming or by foaming the foam layer in a closed mold and subsequent application of a decorative layer 40. FIG. 6 shows this point in the process sequence (i.e. the foam layer and decorative layer have already been applied and masking cover 54 for sealing the cutout in the curb carrier is still in place). In the following process step, masking cover 54 is once again detached from the curb carrier and removed, and the head impact protection device (which, in this embodiment, is provided as a complete structural unit) is inserted and fixed in place of the masking cover. Thus, during back-foaming or foaming, the masking cover has served as a placeholder for the head impact protection device not yet permanently connected to curb carrier 20. This method described with respect to FIG. 6 may be used for all the embodiments presented above, as the present invention is not limited in this respect.

Of course, the present invention is not limited to a certain assembly sequence. In one embodiment, the whole head impact protection device is fixed to the curb carrier of the vehicle door trim even before attachment of the foam and decorative layers. Subsequently, a skin is back-foamed on the curb carrier in the area of the head impact protection device. In the embodiment shown in FIG. 4, wall section 22b of airbag carrier 22 reduces the likelihood of ingress of foam into the chamber filled with folded airbag 24. In the embodiment shown in FIGS. 2 and 3, the foam material does not readily adhere to the fabric layer of airbag 24 guided over first chamber 28 because a cover is disposed over the airbag layer of the head impact protection device. The cover reduces the likelihood of penetration of the foam material into the airbag layer during foaming.

The vehicle door trim according to one embodiment, can be provided with a completely pre-assembled module of the head impact protection device. However, the present invention is not limited in this respect, as the assembly process can be altered as desired. In addition the sequence of the production steps for attachment of the head impact protection device to the vehicle door trim is also variable.

As mentioned above, the airbag described herein is referred to as a headbag for protection of an occupant's head and not what it known as side impact protection. For this reason, in one embodiment, the head impact protection device is disposed in the curb carrier (i.e., in the topmost area of the vehicle door trim). This allows a very rapid response time to be achieved on deployment of the airbag. In addition, in one embodiment, the volume of the airbag can be smaller than if it were attached in the center section of the vehicle door trim.

It should be appreciated that various combinations of the above-described embodiments can be employed together, but several aspects of the invention are not limited in this respect. Therefore, although the specific embodiments disclosed in the figures and described in detail employ particular combinations of features, it should be appreciated that the present invention is not limited in this respect, as the various aspects of the present invention can be employed separately, or in different combinations. Thus, the particular-embodiments described in detail are provided for illustrative purposes only.

It should also be appreciated that a variety of features employed in the art of vehicle manufacture may be used in combination with or to modify the above-described features and embodiments.

The foregoing written specification is to be considered to be sufficient to enable one skilled in the art to practice the invention. While the best mode for carrying out the invention has been described in detail, those skilled in the art to which this invention relates will recognize various alternative embodiments including those mentioned above as defined by the following claims. The examples disclosed herein are not to be construed as limiting of the invention as they are intended merely as illustrative of particular embodiments of the invention as enabled herein. Therefore, systems and methods that are functionally equivalent to those described herein are within the spirit and scope of the claims appended hereto. Indeed, various modifications of the invention in addition to those shown and described herein will become apparent to those skilled in the art from the foregoing description and fall within the scope of the appended claims.

What is claimed is:

1. A vehicle door trim for a motor vehicle with a head impact protection device for a vehicle occupant, the door trim comprising:
   (a) a curb carrier of the vehicle door trim, the curb carrier having a cutout situated in a curb area close to a side window of the vehicle door in the installed position of the vehicle door trim;
   (b) a head impact protection device disnosed in the cutout of the curb carrier, the head impact protection device comprising:
      (i) an airbag carrier joined to the curb carrier in an airtight manner, the airbag carrier having a rim edee;
      (ii) a layer of airbag fabric having an edge area, the edge area of the airbag fabric fixed to the rim edge of the airbag carrier in an airtight manner; and
      (iii) a gas generator permanently attached to the airbag carrier;
   (c) a foam layer disposed over the curb carrier and, in the area of the cutout, over the airbag carrier; and
   (d) a decorative layer disposed on the side of the foam layer facing away from the curb carrier; whereby
   (e) the foam layer is sufficiently elastic that it lifts from the airbag carrier on actuation of the head impact protection device.

2. The vehicle door trim according to claim 1, wherein the head impact protection device has at least one fixing device adapted to join with the body-in-white of the vehicle door.

3. The vehicle door trim according to claim 2, wherein the at least one fixing device encompasses a part of the door seal joined to the body-in-white of the vehicle door in the assembled state.

4. The vehicle door trim according to claim 1, wherein the airbag carrier has a first chamber having a door facing side and a foam layer facing side, wherein the door facing side is sealed so as to be gastight, whereby the foam layer facing side has at least one opening for gas to flow from the gas generator and out of the first chamber toward the foam layer.

5. The vehicle door trim according to claim 4, wherein the first chamber on the side facing towards the foam layer is covered by a single layer of the airbag fabric.

6. The vehicle door trim according to claim 4, wherein the airbag carrier has a second chamber sealed so as to be gastight on the side away from the foam layer and is dimensioned to accommodate compactly folded layers of the airbag.

7. The vehicle door trim according to claim 6, wherein the second chamber facing towards the foam layer has a slot-shaped opening for the airbag fabric, whereby a cross-section of the slot shaped opening is smaller than a cross-sectional dimension of the second chamber.

8. The vehicle door trim according to claim 1, wherein the head impact protection device is adapted to be attached to the curb carrier in one work step as a complete structural unit including the airbag carrier, the airbag and the gas generator.

9. The vehicle door trim according to claim 1, wherein the airbag carrier is welded to the curb carrier.

10. The vehicle door trim according to claim 1, wherein the airbag cater is bonded to the curb carrier.

11. The vehicle door trim according to claim 1, further comprising a cover between the fabric layer of the airbag and the foam layer, the cover being configured such that the foam layer does not penetrate into the fabric layer of the airbag during foaming of the foam material.

12. The vehicle door trim according to claim 11, wherein the cover is a plastic film which is part of the head impact protection device.

13. The vehicle door trim according to claim 11, wherein the cover is a plastic flap which is part of the head impact protection device.

14. The vehicle door trim according to claim 1, wherein the decorative layer comprises a plastic film.

15. The vehiclb door trim according to claim 1, wherein the decorative layer consists of leather, imitation leather or textile material bonded to or stretched over the foam layer.

16. The vehicle door trim according to claim 1, in combination with a vehicle door.

17. The combination according to claim 16, in combination with the vehicle.

18. A method for pre-assembly of a vehicle door trim according to claim 1, comprising:
   (i) sealing the cutouts in the curb cater of the vehicle door trim with a removable masking cover;
   (ii) back-foaming a skin on the curb carrier;
   (iii) removing the masking cover; and
   (iv) inserting and fixing the head impact protection device.

19. A method for pre-assembly of an interior vehicle door trim according to claim 11, comprising:
   (i) installing a head impact protection device on the curb carrier of the vehicle door trim; and
   (ii) back-foaming a skin on the curb carrier.

20. A method for pre-assembly of a vehicle door trim according to claim 1, comprising:
   (i) sealing the cutouts in the curb carrier of the vehicle door trim with a removable masking cover;
   (ii) generating a foam layer in a closed mold;
   (iii) applying the decorative layer onto the foam layer;
   (iv) removing the masking cover; and
   (v) inserting and fixing the head impact protection device.

21. A method for pre-assernbly of an interior vehicle door trim according to claim 11, comprising:
   (i) installing a head impact protection device on the curb carrier of the vehicle door trim;
   (ii) generating a foam layer in a closed mold;
   (iii) applying the decorative layer onto the foam layer.

* * * * *